(12) United States Patent
Jarvis et al.

(10) Patent No.: US 7,000,083 B2
(45) Date of Patent: Feb. 14, 2006

(54) RESYNCHRONIZATION OF COUNT KEY DATA WITH ITS CORRESPONDING META DATA

(75) Inventors: Thomas C. Jarvis, Tucson, AZ (US); David F. Mannenbach, Tucson, AZ (US); Kenneth W. Todd, Tucson, AZ (US)

(73) Assignee: International Business Machines Corp., Armonk, NY (US)

( * ) Notice: Subject to any disclaimer, the term of this patent is extended or adjusted under 35 U.S.C. 154(b) by 419 days.

(21) Appl. No.: 10/456,898

(22) Filed: Jun. 6, 2003

(65) Prior Publication Data

US 2004/0250022 A1 Dec. 9, 2004

(51) Int. Cl.
*G06F 12/00* (2006.01)

(52) U.S. Cl. ............... 711/161; 711/118; 711/162; 709/203

(58) Field of Classification Search .......... 711/4, 711/103, 112–115, 154, 161–162; 709/203, 709/217, 224
See application file for complete search history.

(56) References Cited

U.S. PATENT DOCUMENTS

| | | | |
|---|---|---|---|
| 4,593,354 A * | 6/1986 | Ushiro ................. | 714/48 |
| 5,459,853 A | 10/1995 | Best et al. | |
| 5,581,743 A | 12/1996 | Burton et al. | |
| 5,630,092 A | 5/1997 | Carreiro et al. | |
| 5,857,197 A | 1/1999 | Mullins | |
| 5,983,317 A | 11/1999 | Kanda et al. | |
| 6,009,498 A * | 12/1999 | Kumasawa et al. ...... | 711/113 |
| 6,112,277 A | 8/2000 | Bui et al. | |
| 6,128,717 A | 10/2000 | Harrison et al. | |
| 6,195,761 B1 | 2/2001 | Kedem | |
| 6,425,051 B1 | 7/2002 | Burton et al. | |
| 6,438,646 B1 | 8/2002 | Kitamura et al. | |
| 6,438,661 B1 | 8/2002 | Beardsley et al. | |
| 6,467,024 B1 * | 10/2002 | Bish et al. ............... | 711/114 |
| 6,493,720 B1 | 12/2002 | Chu et al. | |
| 6,526,481 B1 * | 2/2003 | Shen et al. ............... | 711/147 |

FOREIGN PATENT DOCUMENTS

| | | |
|---|---|---|
| WO | WO 01/13236 A1 | 2/2001 |
| WO | WO 01/84371 A2 | 11/2001 |

OTHER PUBLICATIONS

RD n446. Jun. 2000#181 p. 1066.
Technical Support Apr. 2001 "What's Real? Device Formats and Data Types".
"Count-Key-Data Disks" e-mail from Dick Wilmot, Jun. 24, 1994.

* cited by examiner

*Primary Examiner*—Donald Sparks
*Assistant Examiner*—Hashem Farrokh
(74) *Attorney, Agent, or Firm*—Law Office of Charles W. Peterson, Jr.; Dale M. Crockatt

(57) ABSTRACT

A storage system, method of managing a storage system and program product for managing a storage system. Cache fast write (CFW) modified data may be provided to cache in count-key-data (CKD) tracks with associated meta data. A synchronization flag is included on a storage device with associated meta data for each CKD track stored. The cache directory control block (CDCB) includes a CDCB synchronization flag for each CKD track in cache memory. A mismatch in the synchronization flags from a failure during a transfer to storage indicates a storage device loss of synchronization between an accessed CKD track and stored associated meta data.

16 Claims, 1 Drawing Sheet

RESYNCHRONIZATION OF COUNT KEY DATA WITH ITS CORRESPONDING META DATA

BACKGROUND OF THE INVENTION

1. Field of the Invention

The present invention is related to a data storage device or system and more particularly, to maintaining count-key-data (CKD) integrity in a data storage device or system.

2. Background Description

Mass storage devices, such as a Direct Access Storage Device (DASD), may store customer data in a Count-Key-Data (CKD) format. Meta data stored in a separate meta data track associated with each CKD track describes the associated CKD structure. The meta data, which may differ from CKD track to CKD track, is used to make track accesses and operations on the CKD data more efficient. Typical meta data may include for the associated CKD track such information as the CKD track format, the number of records on the CKD track, the number of sectors per record, the data field length and key field length of the records. Whenever a CKD track is format written, the meta data for the track is updated to reflect the new format of the CKD track.

Typically, data communications with DASD are cached in high performance memory for maximum input/output (I/O) performance. Non critical data, e.g., temporary data sets created during a sort job, may be maintained as cache fast write (CFW) modified in volatile memory, e.g., in high performance dynamic random access memory (DRAM). Since this is non-critical data with an acceptable risk of data loss, nothing is stored in non-volatile storage. So if the cache copy is lost, e.g., in a power failure, the data is lost as well as any indication that it was in cache or lost.

When a CKD track is format written as CFW modified, the updated meta data may be committed to the storage device before the formatted CKD track. Consequently, a failure before the new CKD track is committed may mean that the meta data does not match (is not synchronized to) its associated CKD track, e.g., if the cluster containing the modified CKD track crashes. If the uncommitted, perhaps, lost CKD track format differs from the previous CKD track format, then the meta data describes the uncommitted, lost CKD track, not the current, stale CKD track on the device. Since after the crash, the associated meta data for the CKD track does not match the format of the CKD track, re-accessing the CKD track subsequently, either for a read or an update/write operation, results in data errors, e.g., cyclic redundancy check (CRC), longitudinal redundancy check (LRC) and header physical address (PA) checks.

Thus, there is a need for a way to determine whether storage contains the correct meta data for associated CKD tracks and to selectively resynchronize meta data with its associated CKD tracks.

SUMMARY OF THE INVENTION

It is a purpose of the invention to improve storage device data integrity;

It is another purpose of the invention to reduce data error occurrence in data storage devices and data storage systems.

The present invention relates to a storage system, method of managing a storage system and program product for managing a storage system. Cache fast write (CFW) modified data may be provided to cache in count-key-data (CKD) tracks with associated meta data. A synchronization flag is included on a storage device with associated meta data for each CKD track stored. The cache directory control block (CDCB) includes a CDCB synchronization flag for each CKD track in cache memory. A mismatch in the synchronization flags from a failure during a transfer to storage indicates a storage device loss of synchronization between an accessed CKD track and stored associated meta data.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
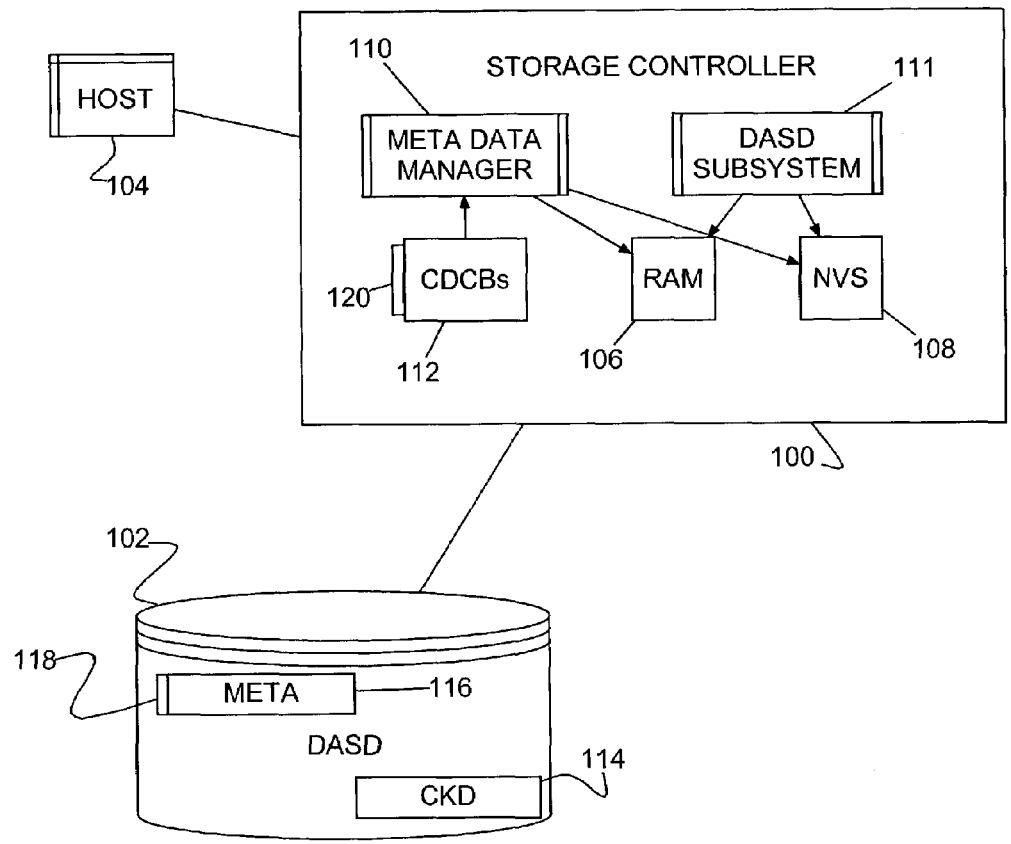
FIG. 1 shows an example of a preferred storage controller controlling data communications between a Direct Access Storage Device (DASD) and a host.

Turning now to the drawings and, more particularly, FIG. 1 shows an example of a preferred storage controller 100 controlling data communications between a Direct Access Storage Device (DASD) 102 (e.g., in the Enterprise Storage Server® Model 800 from IBM Corporation) and a host 104. The host 104 may be any well known computer system, personal computer or computing device running a suitable operating system such as are well known in the art. The storage controller 100 includes cache (cache memory 106 and non-volatile storage (NVS) 108) and a meta data manager 110 and DASD subsystem 111 managing communication with DASD 102. The cache memory 106 may be any high speed memory such as dynamic random access memory (DRAM), static random access memory (SRAM) or the equivalent. The NVS 108 may be, for example, SRAM with battery back-up. The meta data manager 110 and DASD subsystem 111 may be in hardware or, a separate program or a functional part of one or more program and may be implemented as firmware (e.g., microcode in a read only memory (ROM), non-volatile read only memory (NVRAM) or, flash electrically programmable ROM (flash EPROM)) or, within the operating system and/or an application program. Cache directory control blocks (CDCBs) 112 are provided, which the meta data manager 110 uses to manage meta data tracks in the cache memory 106. The DASD 102 includes data tracks, i.e., count-key-data (CKD) tracks 114 and associated meta data tracks 116. Preferably, meta data for each CKD track 116 in the DASD 102 includes an additional synchronization flag 118 that indicates when a CKD track is not synchronized to its associated meta data. Additionally, each CDCB entry includes a corresponding synchronization flag 120 for an associated CKD track in cache memory 106.

The storage controller 100 receives data from the host 104 for storage in the DASD 102. However, since the typical data transfer rate is much higher than the DASD access time, data is cached in cache memory 106 or NVS 108 for subsequent transfer to DASD 102. Thus, the host 104 sees a much higher apparent access time than the actual DASD access. The cached data are stored in cache, temporarily, in CKD tracks with associated meta data in meta data tracks. Meta data may include such information for the associated CKD track as the CKD track format, the number of records on the CKD track, the number of sectors per record, the data field length and key field length of the records. Subsequent to caching, new or modified cached data is transferred to the DASD 102, which also stores the actual data in CKD tracks 114 and the associated meta data in meta data tracks 116.

There may be three types of modified data or cached data in cache (cache memory 106 and NVS 108): NVS modified, sequential fast write (SFW) modified and cache fast write (CFW) modified. NVS modified data is stored in NVS 108 as well as in cache memory 106. If the cache copy is lost, the data is restored from the NVS copy with no data lost. SFW modified data is in cache memory 106 with only the track ID of the modified data stored in NVS 108. If the cache copy is lost, the data is lost but, the track ID in the NVS 108 indicates that the data was lost. CFW modified data is stored only in cache memory 106 with nothing in NVS 108. If the cache copy is lost, e.g., in a power failure, the data is lost without any indication from the cache that it was lost. CFW modified data is low priority data where the risk of data loss is acceptable, e.g., temporary data sets created during a sort job; however, a corrupted DASD 102 is not.

If the cache copy is lost before the CKD track is committed but, after the meta data is committed, the DASD 102 is corrupted, out of sync. Subsequently, the synchronization (CFW_FORMATTED) flags 118, 120 for the corrupted track do not match. So, the mismatch in meta data flag 118 and CDCB flag 120 indicates that the meta data does not match its associated CKD track on the DASD 102 and so, must be resynchronized. In particular, the meta data flag 118 indicates when the meta data does not correspond to its associated CKD track and so, needs to be resynchronized with the CKD track. The CDCB flag 120 enhances performance, by avoiding unnecessarily staging a full track into cache (full track stage) or rebuilding meta data, e.g., traversing and interrogating any remaining CKD track to identify and extract the data field length, key field length and the CKD track format. Then, the number of records is determined on the CKD track and, finally the number of sectors per record. For an example of how meta data may be rebuilt, see U.S. Pat. No. 6,438,661 B1 to Beardsley et al. which is assigned to the assignee of the present invention and incorporated herein by reference.

So, when the meta data flag 118 is set, for example, the corresponding associated CKD track has been CFW modified format written but not yet committed to the device. Similarly, the CDCB flag 120 also indicates that the CKD track has been CFW modified format written but not yet committed to the device. Thus, these 2 flags 118, 120 indicate when updated meta data has been committed to the device but the corresponding CFW modified data has not been committed to the device. If the CKD track is lost before it is committed, on the next access of that track the meta data flag 118 will still be set but, the CDCB flag 120 will not, indicating that the current meta data does not correspond to, and may not describe, the format of what is stored. Unless both the previously stored CKD track and the lost CKD track have the same format, the track formats differ. Consequently, the meta data for the lost CKD track, which is in the device, does not describe the format of the CKD track remaining in the device. Such a loss can occur for a number of reasons, e.g., if the cluster containing the modified CKD track crashes. When the track is subsequently re-accessed, for either a read or update write operation, the meta data for the CKD track does not match the format of the track data. The synchronization flags 118, 120 indicate this mismatch. Typically, the synchronization flags are held reset for NVS modified and SFW modified data. A preferred storage system recovers from such a mismatch to avoid the normally resulting data errors, e.g., CRC and LRC check errors and/or header PA check errors by rebuilding meta data.

Figure 2:
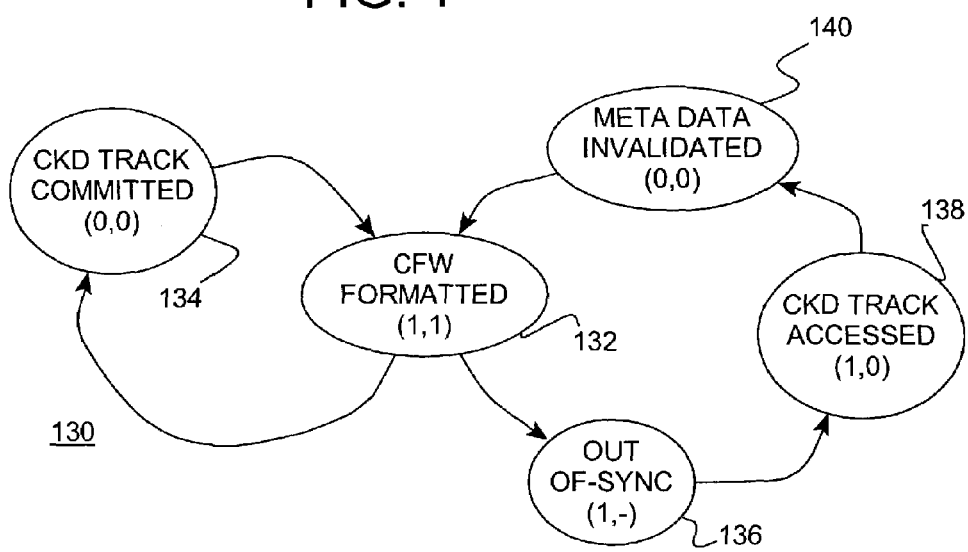
FIG. 2 shows an example of a state diagram of a preferred storage system.

FIG. 2 shows a state diagram 130 of a preferred storage system with reference to the example of FIG. 1. When a particular CKD track 114 is format written as CFW modified, the system enters state 132, setting both the corresponding meta data flag 118 and the CDCB flag 120. Normally, in state 134 the corresponding CKD track 114 is committed to the device and both the meta data flag 118 and the CDCB flag 120 are reset. The meta data and the associated CKD track in DASD 102 are synchronized. However, if after successfully transferring meta data, the CKD transfer to DASD 102 fails for whatever reason, e.g., a power failure, the meta data and the associated CKD track in DASD 102 are not synchronized and the system is in unsynchronized state 136. When, subsequently, that CKD track 114 is accessed, the system enters error state 138; the meta data flag 118 is still set but its CDCB flag 120 is not. Because of synchronization flag 118, 120 mismatch the system enters recovery state 140 where the full track is staged in from the device 102 and the associated meta data is invalidated as the meta data flag 118 is reset. If the full CKD track is still in cache, since meta data can always be rebuilt from customer data, it is rebuilt while keeping the meta data flag 118 reset.

Advantageously, a storage system according to the present invention avoids data corruption problems from meta data being out of sync with an associated CKD track format. Recorded meta data includes an indication of whether or not the CFW modified format written CKD track has been committed and so, the stored CKD track is described by its associated meta data. If the track is accessed and the meta data flag is set but the CDCB flag is not set, then a sync problem has occurred and the meta data is resynchronized by rebuilding meta data for the current CKD track data.

While the invention has been described in terms of preferred embodiments, those skilled in the art will recognize that the invention can be practiced with modification within the spirit and scope of the appended claims.

What is claimed is:

1. A method of managing cache fast write (CFW) modified data transfers between cache memory and a storage device, said method comprising the steps of:
   a) receiving data from a host for storage on a storage device;
   b) setting a pair of synchronization flags, a first of said pair being on said storage device in a meta data track associated with a CKD track and, a second of said pair being in a cache directory control block (CDCB) associated with a selected CKD track in cache containing received said data;
   c) committing said selected CKD track to said storage device; and
   d) resetting said pair of synchronization flags.

2. A method of managing CFW data transfers as in claim 1, said method further comprising the steps of:
   e) accessing a CKD track on said storage device;
   f) checking said pair of synchronization flags for a mismatch, a mismatch indicating that said accessed CKD track is out of synch with associated said meta data.

3. A method of managing CFW data transfers as in claim 2, wherein upon occurrence of a mismatch, said method further comprises the steps of:
   g) staging said CKD track from said storage device, stored said associated meta data being invalid;
   h) resetting one of said pair of synchronization flags, whereby said pair of synchronization flags match.

4. A method of managing CFW data transfers as in claim 3 further comprising rebuilding said associated meta data for said staged CKD track.

5. A method of managing CFW data transfers as in claim 3 wherein said first of said pair is reset.

6. A storage system comprising:
   a storage device;
   a storage controller controlling data communications between said storage device and a host;
   a cache memory temporarily storing data, modified data from said host being transferred from said cache memory to said storage device, data being stored on said storage device in count-key-data (CKD) tracks with associated meta data describing each CKD track format, said meta data being stored in meta data tracks;
   a synchronization flag for said each CKD track stored on said storage device with said associated meta data;
   a plurality of cache directory control blocks (CDCBs) in said cache memory, said plurality of CDCBs including one CDCB for each said CKD cache memory track and an associated meta data cache memory track, each of said plurality of CDCBs containing meta data management information for said associated meta data cache memory track; and
   a CDCB synchronization flag for each said CKD track in cache memory.

7. A storage system as in claim 6, wherein said storage controller sets said synchronization flag and said CDCB synchronization flag for a selected CKD track when modified data is stored in said cache memory.

8. A storage system as in claim 7, wherein said storage controller resets said synchronization flag and said CDCB synchronization flag for said selected CKD track when said modified data is transferred to said storage device.

9. A storage system as in claim 8, wherein a mismatch between said synchronization flag and said CDCB synchronization flag indicates that an accessed CKD track on said storage device is out of synch with stored associated meta data.

10. A storage system as in claim 9, wherein said synchronization flag being set and said CDCB synchronization flag being reset indicates said mismatch.

11. A storage system as in claim 10, wherein responsive to said mismatch said storage controller resets said synchronization flag, said stored associated meta data being invalidated.

12. A storage system as in claim 11, wherein responsive to said mismatch said storage controller rebuilds meta data for a remaining said CKD track in said cache memory.

13. A storage system as in claim 11, wherein said synchronization flag and said CDCB synchronization flag are set only for cache fast write modified data in said cache memory.

14. A storage system as in claim 6, wherein said storage controller includes a meta data manager managing meta data tracks in the cache memory and a Direct Access Storage Device (DASD) subsystem managing communications with said storage device.

15. A computer program product for managing cache fast write (CFW) modified data transfers between cache memory and a storage device, said computer program product comprising a computer usable medium having computer readable program code thereon, said computer readable program code comprising:
   computer readable program code means for providing meta data for data received from a host for storage on a storage device, received said data and provided said meta data being cached in CKD tracks and associated meta data tracks, respectively, in cache memory;
   computer readable program code means for selectively setting and resetting pairs of synchronization flags, a first of each of said pairs being located on said storage device in a meta data track associated with a CKD track and, a second of each of said pairs being located in a cache directory control block (CDCB) and associated with a selected CKD track in cache containing received said received data; and
   computer readable program code means for checking said pair of synchronization flags for a mismatch, a mismatch indicating that an accessed CKD track is out of synch with associated said meta data.

16. A computer program product as in claim 15, further comprising computer readable program code means for rebuilding said associated meta data for said staged CKD track.

* * * * *